US 6,714,649 B1

(12) United States Patent
Masuda et al.

(10) Patent No.: US 6,714,649 B1
(45) Date of Patent: Mar. 30, 2004

(54) PAY BROADCASTING SYSTEM WITH ENHANCED SECURITY AGAINST ILLEGAL ACCESS TO A DOWN LOADED PROGRAM IN A SUBSCRIBER TERMINAL

(75) Inventors: Isao Masuda, Tokyo (JP); Yoshimasa Goto, Kawasaki (JP); Takenosuke Harada, Yokohama (JP); Kazuhiro Machida, Inzai (JP); Mitsuteru Kataoka, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/345,829

(22) Filed: Jul. 1, 1999

(30) Foreign Application Priority Data

Jul. 2, 1998 (JP) .......................................... 10-201090

(51) Int. Cl.⁷ ............................................... H04L 9/44
(52) U.S. Cl. ........................... 380/44; 380/201; 380/277
(58) Field of Search ............................ 380/44, 201, 277

(56) References Cited

U.S. PATENT DOCUMENTS

| 4,533,949 A |  | 8/1985 | Fujimura et al. |
| 4,613,901 A |  | 9/1986 | Gilhousen et al. |
| 4,658,292 A | * | 4/1987 | Okamoto et al. ............. 380/20 |

(List continued on next page.)

FOREIGN PATENT DOCUMENTS

| EP | 0 179 612 | 4/1986 |
| EP | 0704785 | 4/1996 |
| EP | 0817185 | 1/1998 |
| EP | 0822720 A1 | 2/1998 |
| JP | 8-32530 | 2/1996 |
| JP | 8-149449 | 6/1996 |
| JP | 10-11894 | 1/1998 |
| JP | 10-106148 | 4/1998 |

OTHER PUBLICATIONS

Kent, Security Requirements and Protocols for a Broadcast Scenario, IEEE COM–29. No. 6 Jun. 1981.*
Guillou, Encipherment and Conditional Access, SMPTE Journal Jun. 1994.*
Macq, Cryptology for Digital TV Broadcasting, IEEE 83(6) Jun. 1995.*

(List continued on next page.)

*Primary Examiner*—Ayaz Sheikh
*Assistant Examiner*—James Seal
(74) *Attorney, Agent, or Firm*—Louis Woo (57) ABSTRACT

In a pay broadcasting system, data of a broadcast program is scrambled with a scramble key updated in a short period. The scramble key is encrypted with a first key assigned to the subscriber terminal. The first key is encrypted with a first master key set in the subscriber terminal. The security of a broadcast program stored for subsequent use in the subscriber terminal is enhanced as follows. A central station generates a second key-encrypted scramble key by encrypting the scramble key with a second key different from the first key and changeable in an interval shorter than a update interval of the first key; generates an encrypted second key by encrypting the second key with a second master key which has been commonly issued to subscriber terminals of the system; and broadcast the second key-encrypted scramble key and the encrypted second key together with the scrambled data of the program, the first key-encrypted scramble key and the encrypted first key in a multiplexed manner. When a broadcast program is to be stored, the subscriber terminal stores the scrambled data of the broadcast program and the second key-encrypted scramble key; decrypt the encrypted second key with the second master key into the second key, which is added to a stored program second key list. If the stored program is to be executed, the second key-encrypted scramble key is decrypted with a corresponding one of the second keys in the stored program second key list into a decrypted scramble key; and the scrambled data of the broadcast program is unscrambled with the decrypted scramble key.

17 Claims, 5 Drawing Sheets

U.S. PATENT DOCUMENTS

| | | | | |
|---|---|---|---|---|
| 4,712,238 A | * | 12/1987 | Gilhousen et al. | 380/20 |
| 4,799,061 A | | 1/1989 | Abraham et al. | |
| 4,864,615 A | | 9/1989 | Bennett et al. | |
| 4,887,296 A | | 12/1989 | Horne | |
| 5,615,265 A | | 3/1997 | Coutrot | |
| 5,642,420 A | * | 6/1997 | Kuroda et al. | 380/30 |
| 5,754,651 A | | 5/1998 | Blatter et al. | |
| 6,067,121 A | * | 5/2000 | Shigihara | 348/473 |
| 6,460,137 B1 | * | 10/2002 | Akiyama et al. | 713/160 |
| 6,594,758 B1 | * | 7/2003 | Okui | 713/163 |

OTHER PUBLICATIONS

Tung, Research and Implementation of key Distribution and Management on ITV, 1998.*

Mooij, Advances In conditional Access Technology, IEE 1997.*

Saini, VideoCrypt An Open Architecture Pay TV System, IEEE 1991Langelaar, Overview of Protection Methods in Existing TV and Storage Devices, Feb., 1996.*

Handbook of Applied Cryptography by Menezes Vanstone, Oorschot 1997, CRC Press LLC, US p. 36, pp. 551–553.

* cited by examiner

RTPE KEY TABLE — 112

| TERMINAL ID | MASTER KEY ID (TMKi_ID) | MASTER KEY (TMKi) | WORK KEY ID (TWKi_ID) | WORK KEY (TWKi) | VALID TILL | ... |
|---|---|---|---|---|---|---|

FIG. 3

SPE WORK KEY TABLE — 114

| PROGRAM ID | BROADCAST TIME & DATE | VALID PERIOD | WORK KEY ID (PWKp_ID) | WORK KEY (PWKp) | ... |
|---|---|---|---|---|---|

FIG. 5A

PAY BROADCASTING SYSTEM WITH ENHANCED SECURITY AGAINST ILLEGAL ACCESS TO A DOWN LOADED PROGRAM IN A SUBSCRIBER TERMINAL

BACKGROUND OF THE INVENTION

1. Field of the Invention

The invention relates to a pay broadcasting system and, more particularly, to a method of and a system for blocking illegal access to a downloaded and stored program in a subscriber terminal in such a pay broadcasting system.

2. Description of the Prior Art

In a pay broadcasting system, a central station (or program provider) generally broadcasts a scrambled program, permitting a subscriber to unscramble the scrambled program only when the execution of the scrambled program is valid.

Such pay broadcasting system usually uses three kinds of keys: a scramble keys (SKt) updated frequently, say, every second (the suffix t denotes an update time); a work key (WKi) assigned to each of the subscriber terminals (the suffix i is a serial number assigned to a respective subscriber terminal) and updated at the time of renewal of the subscription contract (e.g., once a year); and a master key (MKi) issued to each of the subscriber terminals, stored in an IC (integrated circuit) card and set in the subscriber terminal. The central station scrambles data (PD) of each program with a scramble key of the time to provide scramble key-scrambled data (hereinafter, denoted as "SKt[PD]"), while encrypting each of the scramble keys used for the program with each of the work keys associated with the subscriber terminals to provide work key-encrypted scramble keys WK1[SKt], WK2[SKt], . . . , WKN[SKt], where N is the number of subscriber terminals served by the program provider. At the time of renewal of the subscription contract for the subscriber (terminal) and the program provider, the central station encrypts a new work key (WKi) for the subscriber terminal with the master key associated with the subscriber terminal (i) and issues an IC card which stores a master key-encrypted work key MKi[WKi]. The scramble key-scrambled data, the work key-encrypted scramble keys and the master key-encrypted work keys are multiplexed and broadcast from the center station. If a subscriber terminal has a valid master key of its own, then the terminal can decrypt the master key-encrypted work key MKi[WKi] with its own master key into the work key WKi; decrypt the work key-encrypted scramble keys WKi[SKt] with the work key WKi into the scramble key SKt; and unscramble the scramble key-scrambled data SKt[PD] with the scramble key SKt to finally obtain and enjoy the program data PD.

Japanese unexamined patent publication No. Hei10-11894 (1998) by Karino et al. discloses a system for receiving, recording and playing a pay scrambled broadcast program. If the system is to store a received program, the system also stores key information necessary for playing the stored program. This enables the system to unscramble the stored scrambled program by reading out the stored key information and using the information in the same manner as in case of real time reception. The system is also provided with means for prohibiting playing of a stored problem if the availability of the stored program has expired.

However, if an attacker breaks the work key of a subscriber terminal, the attacker can illegally enjoy the programs broadcast thereafter and having been stored so far until the available period of the work key expires. Once a work key is broken, the stored programs can be used regardless of the available periods of the stored programs even if the system is provided with the above-mentioned prohibiting means. The loss due to the illegal use of broadcast programs can be reduced by shorten the available period of the work keys. However, updating the work keys for hundreds of thousands of subscriber terminals in a short time is impracticable because it takes a lot of time to encrypt each (WKi) of such a lot of work keys with a respective master key (MKi).

SUMMARY OF THE INVENTION

The foregoing program in the prior art has been solved in accordance with the present invention.

In a pay broadcasting system including a central station and a subscriber terminal, data of a broadcast program is scrambled with a scramble key updated in a short period. The scramble key is encrypted with a first key assigned to the subscriber terminal. The first key being encrypted with a first master key set in the subscriber terminal. According to the present invention, a method of enhancing security of a broadcast program stored for subsequent use in the subscriber terminal in such a broadcasting system. In the central station, a second key-encrypted scramble key is generated by encrypting the scramble key with a second key different from the first key and changeable in an interval shorter than an update interval of the first key. An encrypted second key is generated by encrypting the second key with a second master key which has been commonly issued to subscriber terminals served by the central station, The second key-encrypted scramble key and the encrypted second key are broadcast together with the scrambled program, the first key-encrypted scramble key and the encrypted first key in a multiplexed manner. In the subscriber terminal, When a broadcast program is stored for subsequent use, the scrambled data of the broadcast program and the second key-encrypted scramble key are stored; the encrypted second key is decrypted with the second master key into the second key, which is added to a stored program second key list. If the stored program is to be executed, the second key-encrypted scramble key is decrypted with a corresponding one of the second keys in the stored program second key list into a decrypted scramble key; and the scrambled data of the broadcast program is unscrambled with the decrypted scramble key.

In one embodiment, the second master key is distributed stored in an IC card.

Alternatively, the second master key may be encrypted with the first master key and broadcast to the terminals. In this case, the terminal decrypts the encrypted second master key into a decrypted second master key, and uses the decrypted second master key for decryption of the encrypted second key.

In a preferred embodiment, each of the broadcast programs is assigned a respective second key.

In the embodiment, at a time of generating an encrypted key, an ID of the key used for the generation is also generated such that the generated encrypted key and corresponding ID are treated in a pair. The central station is permitted to broadcast a new second key for a program that has broadcast before. If a second key with an ID that accords with an ID of any second key in the stored program second key list is received in a subscriber terminal, the terminal replace the found second key with the received second key. This feature enables the central station to prohibit the use of any broadcast program at any desired time.

BRIEF DESCRIPTION OF THE DRAWING

The features and advantages of the present invention will be apparent from the following description of an exemplary embodiment of the invention and the accompanying drawing, in which.

Throughout the drawing, the same elements when shown in more than one figure are designated by the same reference numerals.

DETAILED DESCRIPTION OF THE PREFERRED EMBODIMENTS

Figure 1:
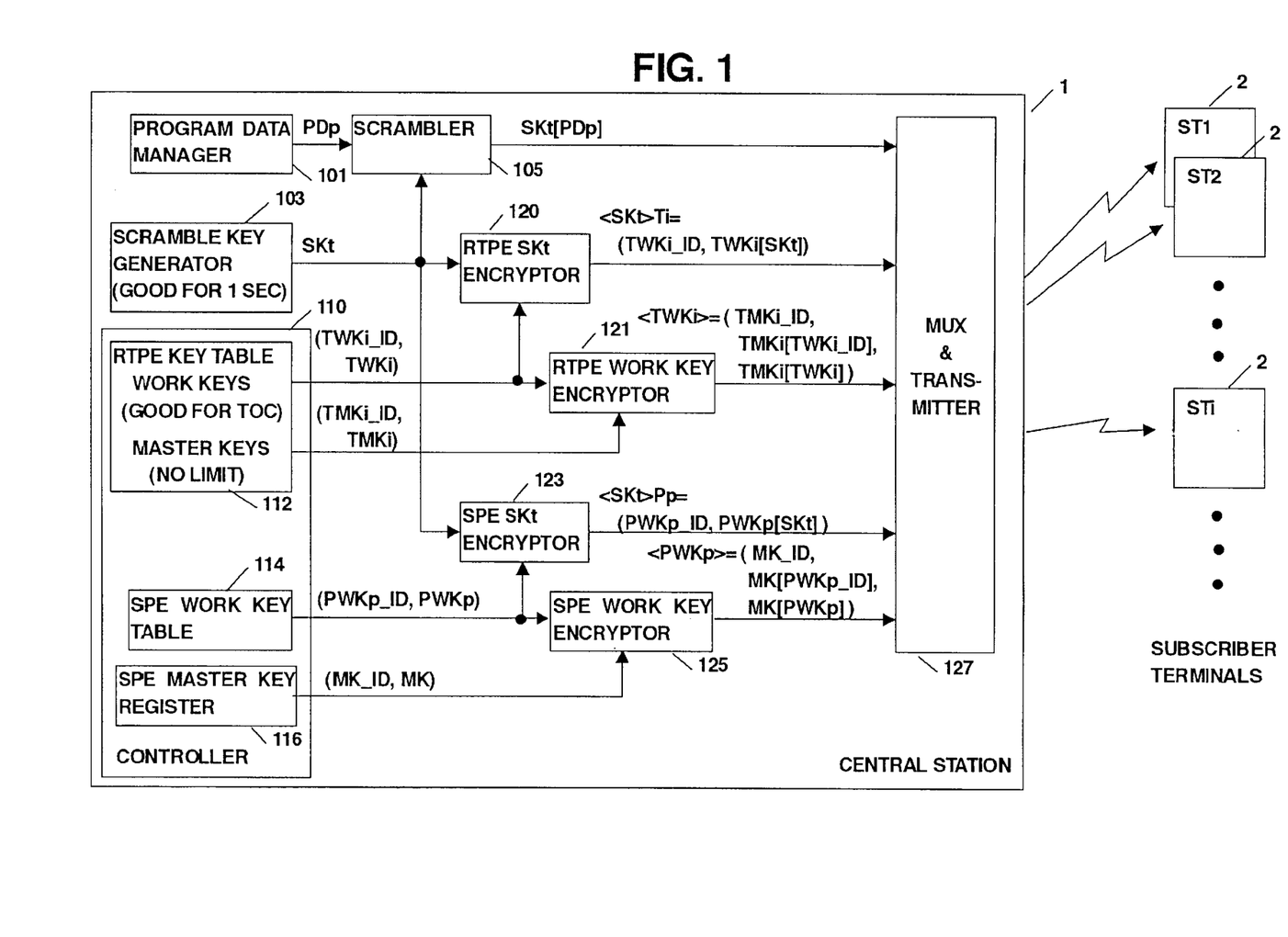
FIG. 1 is a schematic block diagram showing a central station 1 of a pay broadcasting system according to an illustrative embodiment of the invention.

FIG. 1 is a schematic block diagram showing a central station 1 of a pay broadcasting system according to an illustrative embodiment of the invention. As shown in FIG. 1, the pay broadcasting system comprises at least one central station 1 and a multiplicity of subscriber terminals STi (i=1, 2, ... N, where N is the number of subscriber terminals) 2.

The inventive broadcasting system uses two encrypted versions of each of frequently updated scramble keys. The two encrypted versions are encrypted with respective work keys: i.e., a work key for real-time program execution and a work key for stored program execution (hereinafter, referred to as "RTPE work key" and "SPE work key", respectively). A RTPE work key TWKi is assigned to each subscriber terminal STi. The terminal STi can use the key TWKi for unscrambling a received program in real time. A SPE work key PWKp is assigned to each program PDp (p=1, 2, ..., M, where M is the number of programs broadcast in a certain period). The SPE work key PWKp is used for unscrambling a stored program PDp. For this reason, the central station 1 has a RTPE encrypting system and a SPE encrypting system. Similarly, each terminal 2 has a RTPE and a SPE decrypting system.

The central station 1 comprises a program data manger 101 (which may be a computer) for supplying a program data PDp according to a broadcasting schedule; a scrambler 105 whose input is connected to the program data manger 101 output; a scramble key generator 103; a controller 110 which supplies a real-time-program execution (RTPE) scramble key, an RTPE master key, a stored-program execution (SPE) work key and an SPE master key; an RTPE scramble key encryptor 120; an RTPE work key encryptor 121; an SPE scramble key encryptor 123; an SPE work key encryptor 125; and a multiplexer and transmitter (MUX & TRANSMITTER) 127.

Figure 2:
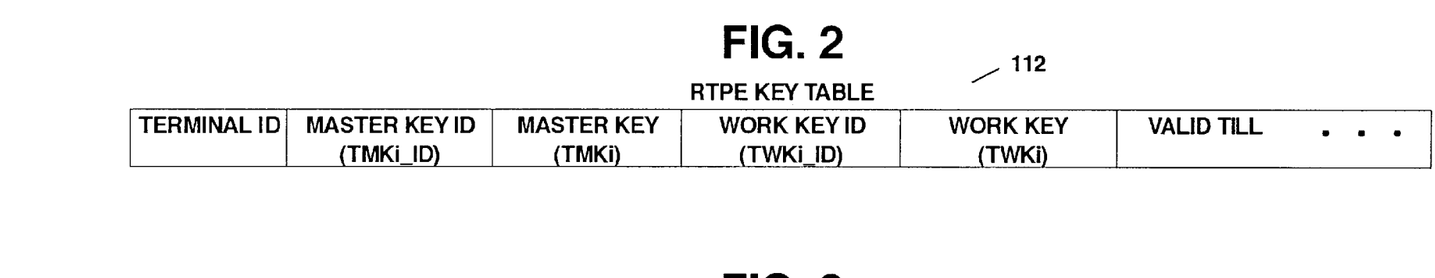
FIG. 2 is a diagram showing an exemplary structure of the RTPE key table 112 stored in the controller 110.
Figure 3:
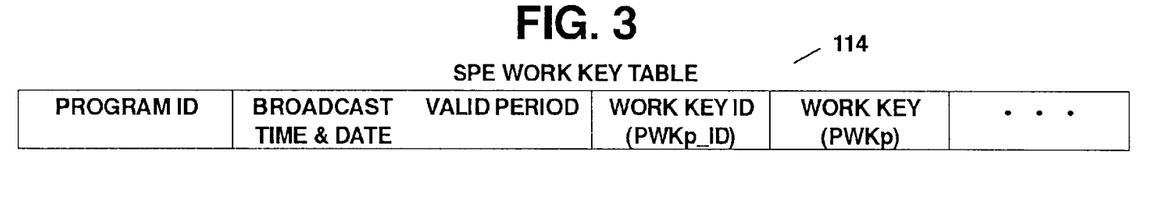
FIG. 3 is a diagram showing an exemplary structure of the SPE work key table 114 stored in the controller 110
Figure 4:
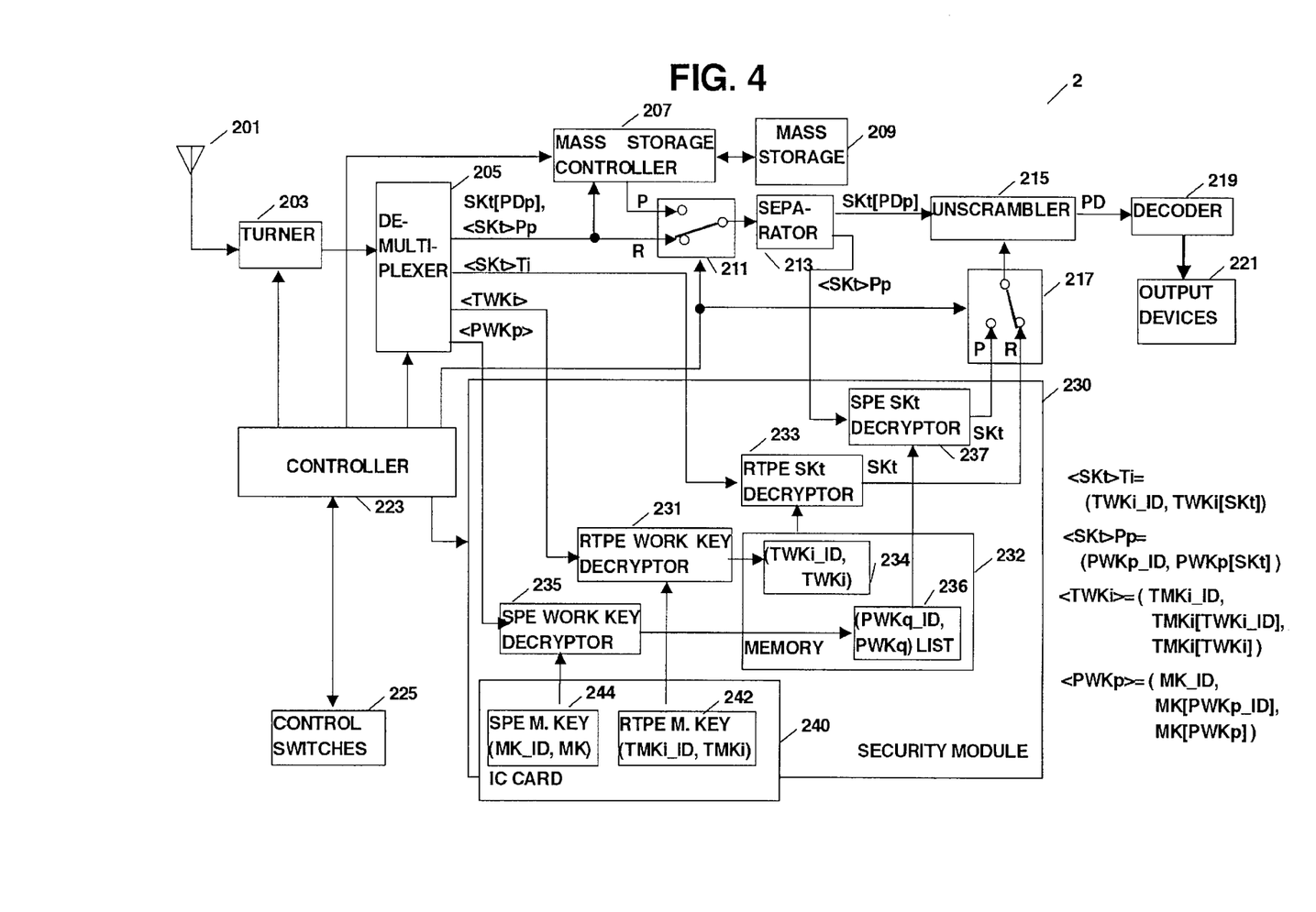
FIG. 4 is a schematic block diagram showing an arrangement of the subscriber terminal (STi) 2 of FIG. 1.

The controller 110 is preferably a computer including a RTPE key table 112, a SPE work table 114 and a SPE master key data 116. FIG. 2 is a diagram showing an exemplary structure of the RTPE key table 112 stored in the controller 110. Each record of the RTPE key table 112 comprises the fields of subscriber terminal ID, RTPE master key identifier (TMKi_ID), RTPE master key (TMKi), RTPE work key identifier (TWKi_ID), RTPE work key (TWKi), expiration data (or contract data) of the RTPE work key, etc. While the master key TMKi is permanently valid, the work key TWKi is valid for a predetermined period of time from a contract or renewal date. An RTPE master key TMKi and an RTPE work key TWKi are assigned to a each terminal STi and recorded in a portable storage media such as an IC card, which is set in a subscriber terminal STi (as shown in FIG. 4). FIG. 3 is a diagram showing an exemplary structure of the SPE work key table 114 stored in the controller 110. Each record of the table 114 comprises the fields of program ID (p), the broadcast time & date, a valid period during which executing or viewing of the program is permitted, a SPE work key identifier (PWKp_ID), a SPE work key (PWKp), etc. An SPE work key PWKp is assigned to each program PDp.

It is noted that the program provider is permitted to set a valid period to each program. If a valid period is set to a program PDp, then the controller 110 updates the work key PWKp at the expiration of the valid period. This enables prevention of executing the programs PDp stored in subscriber terminals. The SPE master key MK 116 stored in the controller 110 is a key assigned to the program provider or the central station 1.

Throughout the figures, any encryptor or decryptor has three terminals: i.e., a terminal through which an encryption or decryption key is input (hereinafter, referred to as "key input (terminal)"); a terminal through which data to be encrypted or decrypted is input (hereinafter, referred to as "(data) input" or simply "input"; and a terminal through which encrypted or decrypted data is output (hereinafter, referred to as "output (terminal)"). The input and put terminals of an encryptor or decryptor are shown as disposed on facing sides of a block that indicates the encryptor or decryptor. The key input terminal is shown as disposed on one of the remaining sides of the block.

It is noted that the arrows in FIGS. 1 and 2 (described later) do not necessarily indicate actual electrical connections. Some of the arrows do indicate actual electrical connections and the others indicate data flows, i.e., logical connections. In other words, an arrow used for such a logical connection indicates that data specified by the label shown along the arrow is supplied from the element where the arrow originates to the element the arrow points.

In broadcast operation, the scramble key generator 103 generates scramble keys SKt very frequently, say, one key per second at time t. The data of a program PDp supplied from the program data manger 101 is scrambled by the scrambler 105 with the scramble key SKt, yielding a scrambled program data SKt[PDp].

(In a similar manner, it is assumed that the result of encrypting data X with a key K is expressed as "K[X]", which is assumed to equal Y. Also, the result of decrypting data Y with the same key X is expressed as K*[Y](=X). Then, expressions such as follows are possible: K*[K[X]]= K*[Y]=X, and K[K*[Y]]=K[X]=Y)

In order to generate key information for real time program execution (RTPE), the RTPE scramble key encryptor 120 receives the scramble key SKt, through its data input, and a pair of RTPE work key identifier TWKi_ID and key itself TWKi (hereinafter, expressed as "(TWKi_ID, TWKi)") for each subscriber terminal STi through its key input; and encrypts the scramble key with the RTPE work key to provide, for each terminal STi, RTPE work key identifier TWKi_ID and RTPE work key-encrypted scramble key TWKi[SKt] (which are hereinafter expressed en bloc as (TWKi_ID, TWKi[SKt]) and referred to as "encrypted scramble key <SKt>Ti"). That is, <SKt>Ti=(TWKi_ID, TWKi[SKt]). In other words, the encryptor 120 outputs N encrypted scramble keys <SKt>T1, <SKt>T2, . . . , <SKt>TN for each scramble key SKt. On the other hand, the RTPE work key encryptor 121 receives RTPE work key and its identifier (TWKi_ID, TWKi) for each subscriber terminal STi, through an encryptor 121 data input, and corresponding RTPE master key and its identifier (TMKi_ID, TMKi), through an encryptor 121 key input terminal; and encrypts the RTPE work key and its identifier (TWKi_ID, TWKi) with the corresponding TRPE master key TMKi to provide, for each terminal STi, a set of an RTPE master key identifier, a TMKi-encrypted RTPE work key identifier and the key itself, i.e., (TMKi_ID, TMKi[TWKi_ID], TMKi[TWKi]). This set is referred to as "encrypted work key <TWKi>". That is, <TWKi>=(TMKi_ID, TMKi[TWKi_ID], TMKi[TWKi]).

In order to generate key information for stored program execution (SPE), the SPE scramble key encryptor 123 receives the scramble key SKt, through its data input, and a pair of SPE work key identifier PMKp_ID and the key itself PMKp (hereinafter, expressed as "(PMKp_ID, PMKp)") for the current broadcast program PDp through an encryptor 123 key input; and encrypts the scramble key with the SPE work key to provide SPE work key identifier PWKp_ID and SPE work key-encrypted scramble key PWKp[SKt] (which are expressed en bloc as (PWKp_ID, PWKp[SKt]) and referred to as "encrypted scramble key <SKt>Pp"). That is, <SKt>Pp=(PWKp_ID, PWKp[SKt]). On the other hand, the SPE work key encryptor 125 receives SPE work key and its identifier (PWKp_ID, PWKp), through an encryptor 125 data input, and the SPE master key and its identifier (MK_ID, MK), through an encryptor 125 key input terminal; and encrypts the SPE work key and its identifier (PWKp_ID, PWKp) with the SPE master key MK to provide a set of the SPE master key identifier, an MK-encrypted SPE work key identifier and an MK-encrypted SPE work key, i.e., (MK_ID, MK[PWKp_ID], MK[PWKp]). This set is referred to as "MK-encrypted work key <PWKp>". That is, <PWKp>= (MK_ID, MK[PWKp_ID], MK[PWKp]).

The scrambled program data STt[PDp], the RTPE encrypted scramble keys <SKt>T1~<SKt>TN, the RTPE master key encrypted work keys <TWK1>~<TWKN>, the SPE encrypted scramble key <SKt>Pp and the SPE master key encrypted work keys <PWKp> are supplied to the MUX & transmitter 127, and multiplexed and transmitted to the terminals 2.

FIG. 4 is a schematic block diagram showing an arrangement of the subscriber terminal (STi) 2 of FIG. 1. In FIG. 4, the terminal 2 comprises an antenna 201; tuner 203 having its input connected with the antenna 201; a demultiplexer 205 having its input connected with a tuner 203 output; a mass storage controller 207 having its record data input terminal connected with a demultiplexer 205 first output terminal; a mass storage for storing programs to be recorded and encrypted scramble keys used for unscrambling the stored programs; a 1-of-2 selector 211 having R and P inputs (for RTPE mode and SPE mode) connected with the demultiplexer 205 first output terminal and the mass storage controller 207 read data output, respectively; a separator 213 having its input connected with the selector 211 output; a unscrambler 215 having its input connected with the separator 213 SKt[PDp] output terminal; a 1-of-2 selector 217 having its output connected with the scrambler 215 key input; a decoder 219 having its input connected with the scrambler 215 output; output devices 221 such as a display device, loudspeakers, etc.; a controller 223 for controlling overall operation of the terminal 2; a control switches 225 with which the user can give the controller 223 desired instructions; and a security module 230.

The security module 230 comprises a memory 232 for storing a reference RTPE work key (TWKi_ID, TWKi) 234 for the program being received and SPE work keys (or a stored program work key list) $\{PWKq\}_{q \in Q}$ ($Q \subset (p|p=1, 2, \ldots, M)$) 236 for the stored programs $\{PDq\}_{q \in Q}$ stored in the mass storage 209; an RTPE work key decryptor 231 having its data input connected with the demultiplexer 205 <TWKi>output; an RTPE scramble key decryptor 233 having its data input connected with the demultiplexer 205 <SKt>Ti output and its output connected with the selector 217 R input (for RTPE mode); an SPE work key decryptor 235 having its data input connected with the demultiplexer 205 <PWKp> output; and an SPE scramble key decryptor 237 having its data input connected with the separator 213 <SKt>Pp output and its output connected with the selector 217 P input. The security module 230 further includes an IC card interface (not shown) for setting an IC card 240 in the module 230. The IC card 240 stores a piece of RTPE master key information (TMKi_ID, TMKi) 242 and a piece of SPE master key information (MK_ID, MK) 242. The controller 223 supplies the tuner 203, the demultiplexer 205 and the security module 230 with respective control signals. Also, the controller 223 supplies the selectors 211 and 217 with an identical control signals.

In operation, the user can select a desired service or channel through one or more of the control switches 225. Then, the tuner 203 selects the desired channel from radio wave signals received by the antenna 201 and passes the selected channel signal to the demultiplexer 205. The demultiplexer 205 demultiplexes the channel signal to output, via its first output terminal, the scrambled program data SKt[PDp] and the encrypted scramble keys <SKt>P1~<SKt>PM and to output the encrypted scramble keys <SKt>T1~<SKt>TN, the encrypted work keys <TWK1>~<TWKN> and the MK-encrypted work keys <PWK1>~<PWKM> via respective output terminals of the demultiplexer 205.

The subscriber terminal 2 operates in one of the three modes: i.e., a real-time program execution (RTPE) mode in which a received program data is directly presented to the user; a recording mode in which the received program data is stored in the mass storage 209; a stored program execution (SPE) mode in which a specified one of the stored programs is executed and presented to the user; and a stand-by mode.

In the RTPE mode, the selectors 211 and 217 are so controlled the R input is selected, i.e., the R input is connected to the common (output) terminal. Then, the demultiplexer 205 first output is supplied to the separator 213. Accordingly, the scrambled program data SKt[PDp] is supplied to the unscrambler 215.

On the other hand, the RTPE work key decryptor 231 monitors each of the received encrypted work keys <TWK1>~<TWKN>from the demultiplexer 205 to see if the master key identifier TMKi_ID of the received encrypted work key (TMKi_ID, TMKi[TWKi_ID], TMKi[TWKi]) accords with the original master key identifier of the RTPE master key (TMKi_ID, TMKi) 242 stored in the IC card 240. If so, the decryptor 231 decrypts the received TMKi-encrypted work key ID and the received TMKi-encrypted work key with the original master key TMKi to obtain an RTPE work key (TWKi_ID, TWKi), which is stored as 234 in the memory 232.

The RTPE scramble key decryptor 233 monitors each of the received encrypted scramble keys <SKt>T1~<SKt>TN from the demultiplexer 205 to see if the work key identifier TWKi_ID of the received encrypted scramble key (TWKi_ID, TWKi[SKt]) accords with the work key identifier of the RTPE work key (TWKi_ID, TWKi) 234 stored in the memory 232 by the RTPE work key decryptor 231. If so, the decryptor 233 decrypts the received TWKi-encrypted scramble key TWKi[SKt] with the stored RTPE work key TWKi to obtain the scramble key SKt. The obtained scramble key SKt is supplied to the key input of the unscrambler 215 through the selector 217. By using the obtained scramble key SKt, the unscrambler 215 decrypts the encrypted program data SKt[PDp] into original program data PDp, which is then decoded in the decoder 219 and presented through output devices 221 to the user. In this way, if the RTPE master key (TMKi_ID, TMKi) is valid, the user can enjoy the broadcast program in real time.

In case of the recording mode, i.e., if a program "q" (specified by the user) is to be recorded in the mass storage 209, the selectors 211 and 217 are controlled in the same manner as in case of the RTPE mode. For this reason, the received program data can be presented to the user in real time while being recorded in the mass storage 209. In this mode, the mass storage controller 207 stores the encrypted program data SKt[PDq] and the encrypted scramble key <SKt>Pq as they are (i.e., in a multiplexed manner) in the mass storage 209. Alternatively, the program data SKt[PDq] and the encrypted scramble key <SKt>Pq may be stored in separate areas in the storage 209 associating the former with the latter. Further, the data SKt[PDq] and the key <SKt>Pq may be stored even in different storage media as long as they are associated with each other.

When the data SKt[PDq] and the encrypted scramble key <SKt>Pq are stored in the storage 209, the SPE work key decryptor 235 monitors each of the received encrypted work keys <PWKp> from the demultiplexer 205 to see if the master key identifier MK_ID of the received encrypted work key (MK_ID, MK[PWKp_ID], MK[PWKp]) accords with the original master key identifier of the SPE master key (MK_ID, MK) 244 stored in the IC card 240. If so, the decryptor 235 decrypts the matched work key <PWKp> with the original SPE master key MK into an SPE work key (PWKp_ID, PWKp), and adds the obtained SPE work key as (PWKq_ID, PWKq) to the stored program work key list 236, i.e., SPE work keys $\{PWKq\}_q \in Q$ ($Q \subset \{p|p=1, 2, \ldots, M\}$) 236 for the stored programs $\{PDq\}_q \in Q$ stored in the mass storage 209.

Thereafter, in any mode, the controller 223 monitors a work key identifier PWKp_ID of a decrypted version of each of the received encrypted work keys <PWKp> from the demultiplexer 205 to see if there is any stored program work key (PWKq_ID, PWKq) whose work key identifier PWKq_ID accords with the work key identifier PWKp_ID in the stored program work key list 236. If so, then the controller 223 replaces the work key PWKq of the matched stored program work key (PWKq_ID, PWKq) with the work key PWKp of the decrypted version. Doing this enables the central station 1 to update a stored program work key in the stored program work key list 236 in the subscriber terminals 2.

In the SPE mode or if the user has issued a play (or execution) command concerning one of the stored programs in the mass storage 209, the controller 223 controls the selectors 211 and 217 to select the P terminals. The controller 223 also commands the mass storage controller 207 to read out the program "q" specified by the user from the mass storage 209 ($q \in Q$, where Q is a subset of $\{p|p=1, 2, \ldots, M\}$). The read-out encrypted program data SKt[PDq] and encrypted scramble key <SKt>Pq are supplied to the separator 213 input through the selector 211. The separator 213 outputs the read encrypted program data SKt[PDq] and encrypted scramble key <SKt>Pq to the unscrambler 215 input and the SPE scramble key decryptor 237 data input, respectively.

The decryptor 237 searches the stored program work key list 236 for a stored program work key (PWKq_ID, PWKq) whose work key identifier PWKq_ID accords with the work key identifier of the received encrypted scramble key <SKt>Pq from the separator 213. Then, the decryptor 237 decrypts the received encrypted scramble key <SKt>Pq with the work key PWKq of the found work key (PWKq_ID, PWKq) 236. This decryption must be successful as long as the work key used for the decryption has not been updated by the central station 1. Otherwise, the decryption will fail.

The decrypted program data PDq is then decoded in the decoder 219 and presented through output devices 221 to the user. In this way, if the SPE master key (MK_ID, MK) is valid and if the stored program work key 236 used for decryption remains unchanged since a program to be executed has been stored in the mass storage 209, the user can enjoy the program.

As seen from the foregoing, even if any of the SPE work keys is broken, the loss caused by the breakage can be minimized because the SPE work keys are assigned to respective broadcast programs. Further, the program provider 1 can change the SPE work keys even after the SPE work keys have been broadcast. This further enhances the security of the downloaded programs.

Modification

Figure 5A:
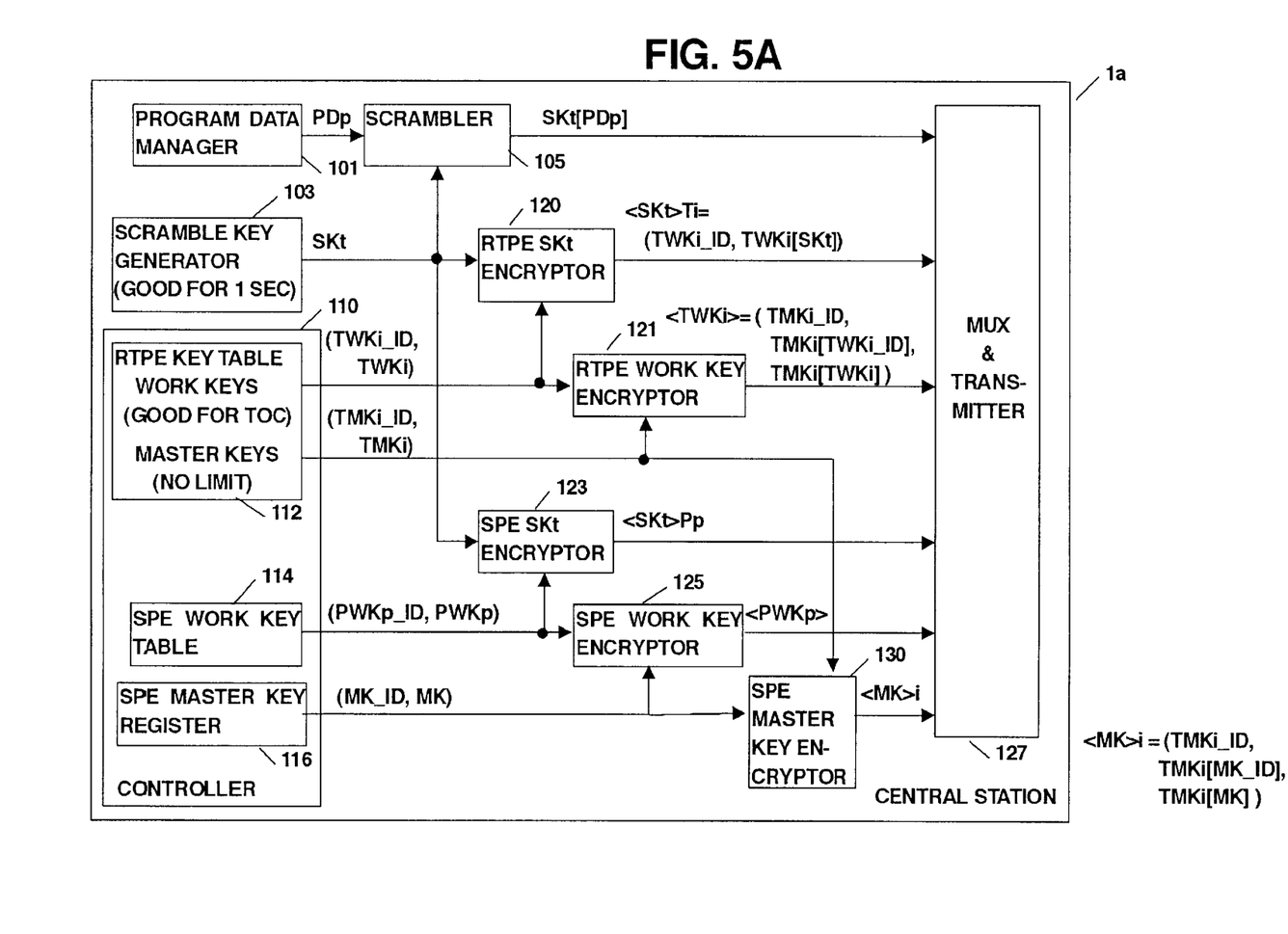
FIGS. 5A and 5B are schematic block diagrams showing an exemplary central station 1a and subscriber terminal 2a of a pay broadcasting system according to a modification of the embodiment shown in FIGS. 1 and 4.

The above-described embodiment shown by FIGS. 1 and 4 can be arranged as shown in FIGS. 5A and 5B. In FIG. 5A, a central station 1a further comprises a SPE master key encryptor 130 for encrypting the SPE master key (MK_ID, MK) with each of the RTPE master keys TMK1~TMKN to provide TMKi-encrypted SPE master keys <MK>1, <MK>2, . . . , <MK>N, which are multiplexed and transmitted with the above-mentioned signals by the MUX & transmitter 127. A TMKi-encrypted SPE master key <MK>i is defined as (TMKi_ID, TMKi[MK_ID], TMKi[MK]).

Figure 5B:
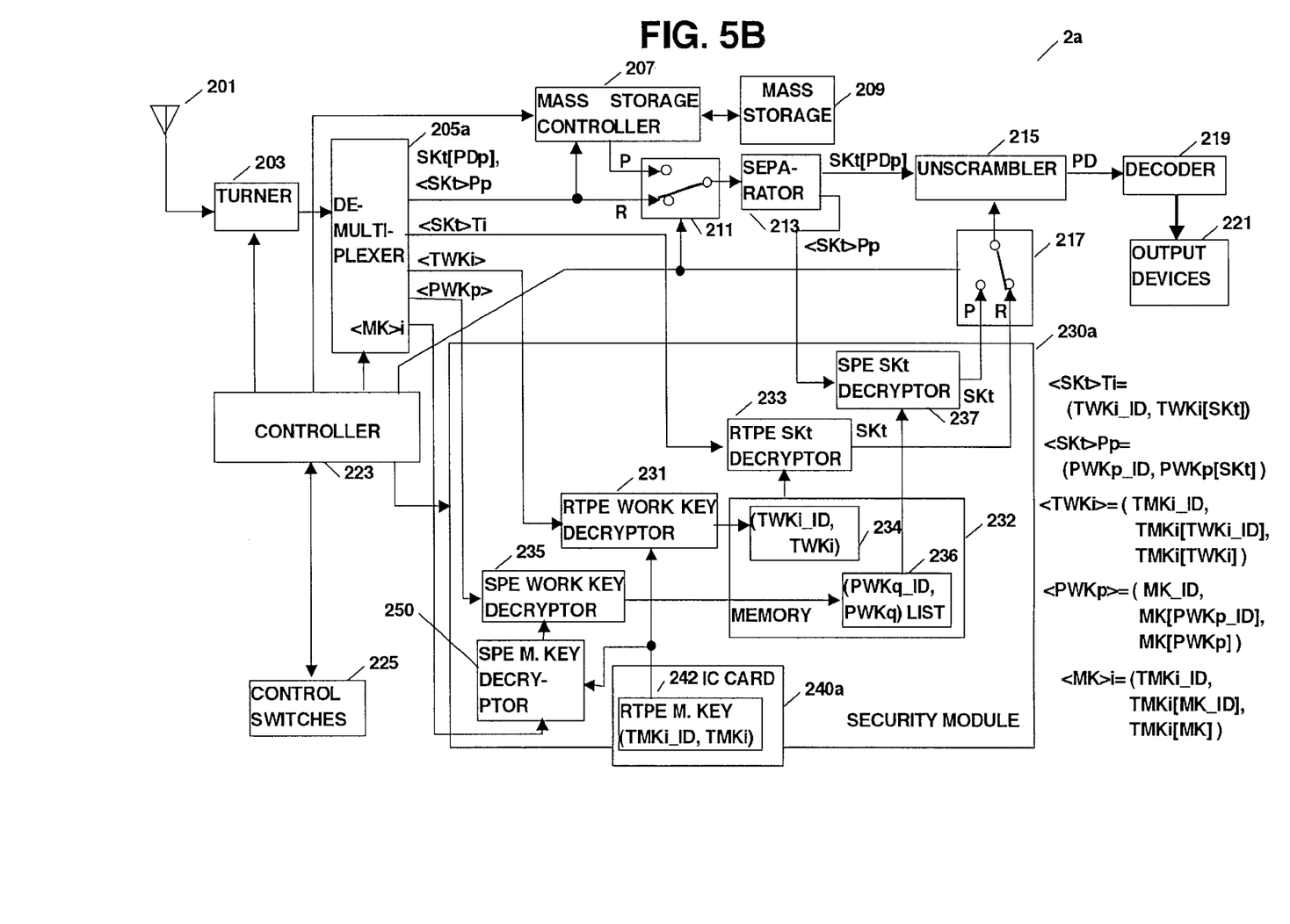

In a subscriber terminal 2a of FIG. 5B, the demultiplexer 205 has been replaced with a demultiplexer 205a which further has an output terminal for outputting the SPE master keys <MK>i. The terminal 2a further provided with a SPE master key decryptor 250 for decrypting each of the received encrypted SPE master keys, <MK>i, with the RTPE master key (TMKi_ID, TMKi) 242 stored the IC card 240a (which no longer stores the above-described SPE master key (MK_ID, MK) 244) to provide a decrypted received encrypted SPE master key if the RTPE master key identifier TMKi_ID of the received encrypted SPE master key <MK>i accords with that of the stored RTPE master key 242. The decryptor 235 uses the received SPE master key (MK_ID, MK) instead of the stored SPE master key (MK_ID, MK) 244.

In this system, the master key for RTPE mode is distributed stored in an IC card 240a, while the master keys for SPE mode are broadcast to the terminals 2a. This facilitate the change of the SPE master keys.

Many widely different embodiments of the present invention may be constructed without departing from the spirit and scope of the present invention. It should be understood that the present invention is not limited to the specific embodiments described in the specification, except as defined in the appended claims.

What is claimed is:

1. In a pay broadcasting system including a central station and a subscriber terminal wherein data of a broadcast program is scrambled with a scramble key updated in a short period, the scramble key being encrypted with a first key assigned to the subscriber terminal, the first key being encrypted with a first master key set in the subscriber terminal, a method of enhancing security of a broadcast program stored for subsequent use in the subscriber terminal, the method including the steps of:

the central station generating a second key-encrypted scramble key by encrypting said scramble key with a second key, said second key being different from said first key and changeable in an interval shorter than a update frequency of said first key;

generating an encrypted second key by encrypting said second key with a second master key which has been commonly issued to subscriber terminals served by said central station; and broadcasting said second key-encrypted scramble key and said encrypted second key together with said scrambled data of said broadcast program, said first key-encrypted scramble key and said encrypted first key in a multiplexed manner, and the subscriber terminal in storing said broadcast program, storing said scrambled data of said broadcast program and said second key-encrypted scramble key, decrypting said encrypted second key with said second master key into said second key and adding said second key to a stored program second key list;

if said stored program is to be executed, decrypting said second key-encrypted scramble key with a corresponding one of said second keys in said stored program second key list into a decrypted scramble key; and unscrambling said scrambled data of said broadcast program with said decrypted scramble key.

2. A method as defined in claim 1, further including the step of setting a removable storage storing said second master key in said subscriber terminal.

3. A method as defined in claim 1, further including the steps of:

said central station encrypting said second master key with said first master key and broadcasting said encrypted second master key; and said terminal decrypting said encrypted second master key into a decrypted second master key, and wherein said step of decrypting said encrypted second key with said second master key uses said decrypted second master key.

4. A method as defined in claim 1, further including the step of assigning different second keys to respective broadcast programs.

5. A method as defined in claim 4, wherein each of said generating steps includes the step of generating an ID of the key used for said generated encrypted key such that said generated encrypted key and corresponding ID are treated in a pair, wherein the method further includes the steps of:

the central station broadcasting a new second key for a program that has broadcast before; and if a second key with an ID that accords with an ID of any second key in said stored program second key list is received, the subscriber terminal replacing said any second key with said second key with said ID that accords.

6. A station for broadcasting a program to a multiplicity of subscriber terminals with an enhanced security of down loaded programs in a pay broadcasting system, the station comprising:

means for scrambling data of a broadcast program with a scramble key updated in a short period;

means for encrypting said scramble key with a first key assigned to each terminal;

means for encrypting, for each terminal, said first key with a first master key set in said terminal;

means for generating a second key different from said first key in an time interval shorter than a update interval of said first key;

means for encrypting said scramble key with said second key into a second key-encrypted scramble key by;

means for generating an encrypted second key by encrypting said second key with a second master key which has been commonly issued to said subscriber terminals; and means for broadcasting said scrambled data of said broadcast program, said first key-encrypted scramble key, encrypted first key, said second key-encrypted scramble key and said encrypted second key in a multiplexed manner.

7. A station as defined in claim 6, wherein said second master key is distributed stored in a removable storage to said subscriber terminal.

8. A station as defined in claim 6, further comprising means for encrypting said second master key with said first master key and broadcasting said encrypted second master key.

9. A station as defined in claim 8, further comprising means for changing said second master key.

10. A station as defined in claim 6, wherein each of broadcast programs is assigned a respective second key.

11. A station as defined in claim 10, wherein each of said generating means includes means for generating an ID of the key used for said generated encrypted key such that said generated encrypted key and corresponding ID are treated in a pair, wherein the station further comprises means for broadcasting a new second key for a program that has broadcast before so as to prohibit any use of said program that has broadcast before.

12. A subscriber terminal capable of storing a received program and executing one of the stored programs later with an enhance security against illegal access to the stored programs in a pay broadcasting system, wherein data of the received program has been scrambled with a scramble key, the subscriber terminal including:

means for demultiplexing said received program into scrambled program data, first encrypted scramble keys encrypted with first keys for subscriber terminals in the broadcasting system and encrypted first keys encrypted with respective first master keys;

means for using said scrambled program data, said first encrypted scramble keys and said encrypted first keys to present said received program to a user in real time;

said demultiplexing means further providing a second encrypted scramble key encrypted with a second key different from said first key and changeable in an time interval shorter than a update interval of said first key and an encrypted second key encrypted with a second master key which has been commonly issued to said subscriber terminals;

means, responsive to a recording command to store said received program from said user, for storing said scrambled program data and said second encrypted scramble key;

means, responsive to said recording command, for decrypting said encrypted second key with said second master key into said second key and adding said second key to a stored program second key list;

means, responsive to a execution command to execute said stored program, for decrypting said second encrypted scramble key with a corresponding one of said second keys in said stored program second key list into a decrypted scramble key; and means for unscrambling said scrambled program data with said decrypted scramble key.

13. A subscriber terminal as defined claim 12, wherein said second master key is stored in a removable storage, which is set in the subscriber terminal.

14. A subscriber terminal as defined claim 12, wherein said demultiplexing means further providing an encrypted second master key encrypted with said first master key and wherein the subscriber terminal further comprising means for decrypting said encrypted second master key into a decrypted second master key, and wherein said means for decrypting said encrypted second key with said second master key uses said decrypted second master key.

15. A subscriber terminal as defined claim 12, wherein each of broadcast programs is assigned a respective second key.

16. A subscriber terminal as defined claim 15, wherein each of said various encrypted keys is broadcast with an ID of the key used for generating said each encrypted key such that said each encrypted key and corresponding ID are treated in a pair, wherein the subscriber terminal includes means, operative in the event a second key with an ID that accords with an ID of any second key in said stored program second key list is received, for replacing said any second key with said second key with said ID that accords.

17. A subscriber terminal as defined claim 12, wherein said using means, said means for decrypting said encrypted second key and said means for decrypting said second encrypted scramble key are realized as a single module.

* * * * *